United States Patent [19]
Stahl

[11] Patent Number: 5,758,941
[45] Date of Patent: *Jun. 2, 1998

[54] PIXEL COMPENSATED ELECTRO-OPTICAL DISPLAY SYSTEM

[76] Inventor: Thomas D. Stahl, 2 Acorn St., Portola Valley, Calif. 94028

[*] Notice: The term of this patent shall not extend beyond the expiration date of Pat. No. 5,557,353.

[21] Appl. No.: 715,296

[22] Filed: Sep. 17, 1996

Related U.S. Application Data

[63] Continuation of Ser. No. 231,296, Apr. 22, 1994, Pat. No. 5,557,353.

[51] Int. Cl.$^6$ .................................................. G03B 21/28
[52] U.S. Cl. ............................................. 353/69; 353/31
[58] Field of Search ...................... 353/69, 70, 37, 353/31; 359/629, 630, 631, 633; 349/5

[56] References Cited

U.S. PATENT DOCUMENTS

| | | | |
|---|---|---|---|
| 4,983,032 | 1/1991 | Van Den Brandt | 353/37 |
| 5,022,750 | 6/1991 | Flasck | 353/31 |
| 5,024,524 | 6/1991 | Flasck | 353/31 |
| 5,027,576 | 7/1991 | Vassiliadis et al. | 433/215 |
| 5,101,279 | 3/1992 | Kurematsu et al. | 348/781 |
| 5,150,138 | 9/1992 | Nakanishi et al. | 353/31 |
| 5,164,848 | 11/1992 | Firth et al. | 359/630 |
| 5,299,063 | 3/1994 | Fritz et al. | 359/631 |
| 5,309,169 | 5/1994 | Lippert | 359/14 |
| 5,359,345 | 10/1994 | Hunter et al. | 359/48 |
| 5,389,982 | 2/1995 | Lee | 353/37 |
| 5,398,086 | 3/1995 | Nakano et al. | 353/31 |
| 5,548,357 | 8/1996 | Appel et al. | 353/70 |
| 5,555,041 | 9/1996 | Manabe | 353/37 |
| 5,557,353 | 9/1996 | Stahl | 353/69 |

OTHER PUBLICATIONS

Japan Display '92 —Session S9, Tuesday, Oct. 13; 3D Displays; Presentations S9–1 through S9–7.
"Projection Systems for Light Valves", Anthony G. Dewey, IEEE Transactions on Electron Devices, vol. ED–24, No. 8, Jul. 1977.

*Primary Examiner*—William Dowling
*Attorney, Agent, or Firm*—Harness, Dickey & Pierce, P.L.C.

[57] ABSTRACT

A pixel compensated electro-optical display system utilizing a pixel compensator to correct image problems. The pixel compensator comprises pixels having elongated geometric shapes that compensate for distortions normally occurring in optical systems utilizing one or more reflective surfaces. The pixels are configured so that when the image plane is viewed at a particular angle, the image is substantially corrected without complex optical refiguring. The pixel compensated electro-optical display system of the present invention accordingly minimizes the need to correct the reflected image. The optical system of the present invention finds utility in applications that require a reflected image because of spatial and other constrictions. The optical system of the present invention finds particular application in vehicle "heads up" display systems as well as in virtual reality and total immersion display systems.

19 Claims, 6 Drawing Sheets

PIXEL COMPENSATED ELECTRO-OPTICAL DISPLAY SYSTEM

This is a continuation of U.S. patent application Ser. No. 08/231,296, filed Apr. 22, 1994 now U.S. Pat. No. 5,557,353.

BACKGROUND OF THE INVENTION

I. Field of the Invention

The present invention relates generally to reflecting image planes used in optical applications. More particularly, the present invention relates to a pixel compensated electro-optical display system. The display includes a light source, a pixel compensator, and a first surface mirror.

II. Description of the Prior Art

Image distortions are routinely encountered in typical video projection systems. This is because most video projection systems require, somewhere along the projection route, the use of a reflective image plane of some type to provide a compact system by reducing the total length needed for the image projection to be made. For example, in large-screen television projectors, a series of reflective surfaces are used to allow for the compact construction of the projection system itself. The significant distortions are caused by the fact that the object (for example, the projected CRT image) and the projection screen are not themselves parallel. The same problem arises in any projection system that relies on a reflected image. Such systems included television projection, high definition television projections, and almost all audio-visual applications.

The problem of distorted video projections has traditionally been approached using relatively complex lensing and optical systems. The image distortions that are introduced by the optical geometry of the typical projection system have not historically been of significant concern because the picture quality has generally been held to be acceptable. However, more lately, data and video projectors have been developed to specifically display computer generated video information. In such applications, the video image distortions are not merely annoying, but are, in fact, critical flaws in such projection systems.

Typical distortions encountered in projection television systems include non-uniform focus, keystone distortion, and vertical and horizontal non-linearity. Each of these distortions results from the fact that the image source, that is, the projector and the display screen, are not parallel. This occurs where a projector image source is off the central optic axis. This phenomenon is known as horizontal displacement. Another possibility is where the axis of the projector is tilted with respect to the screen. This phenomenon is called vertical displacement. (See "Image Distortions in Video Projection", Dennis W. Vance, Vertex Video Systems publication.) Both horizontal displacement and vertical displacement exist in the typical 3-tube color projecting unit. Such displacements result in the distortions mentioned above.

The first of these distortions, non-uniform focus, results from the non-horizontal placement of the projector with respect to the screen because only one part or the other of the image on the screen may be focused while the other remains out of focus. This is true because the focal length between the projector and the image is not constant. Conventionally, non-uniform focus has been corrected by using a fairly complex system of lenses disposed between the projector and the screen.

The two remaining types of distortions, keystone distortion and those distortions related to non-linearity, are the result of image geometry. This is based on the fact that use of a projector and an image screen, when not parallel, results in magnification of the image being varied along the direction of the tilted plane. This distortion still remains, even after the interdisposition of a lens between the projector and the screen. Two types of distortions result from the magnification problem, the first of which is called keystone distortion and the second of which is called vertical non-linearity. Keystone distortion results in variation of the horizontal magnification, while vertical non-linearity distortion results in variation of the vertical magnification.

Traditionally, efforts to correct these distortions have been made both electronically and optically. Electronic corrections include the pre-distorting of the primary image. This approach has been taken typically where CRT's and light-addressed light valves are employed. The modification of the optical system has conventionally been taken where matrix-addressed light valves are employed. The correction of the distortions is extremely expensive and often produces enormously complex electronic and optical corrections systems. This is because the conventional approach has been to correct not the projection system, but the optics themselves.

SUMMARY OF THE PRESENT INVENTION

The present invention provides a reflecting image plane which overcomes the above-mentioned disadvantages.

In brief, the present invention comprises an electro-optical display system that provides an image without distortion.

This is accomplished by a pixel compensated display that includes a light source, a pixel compensator (mounted either fixedly at a 45° angle or mounted pivotably), a first surface mirror, and a projection screen. The final image is free from distortion. The pixel compensator may be characterized as active, passive, or a straight passive (with simple lines), and may be composed of various materials including a single crystal silicon, an amorphous silicon, or a polysilicon.

The pixel compensated electro-optical display system of the present invention resolves a number of optical problems. For example, stigmatism is eliminated by proper alignment of the first surface mirror with respect to the pixel compensator.

The system may be used in conjunction with any flat projection system or any active matrix system, or any system that utilizes a light valve approach to projection. The system may be used in combination with conventional television, high definition television, or any similar CRT projection application. As noted, the optical system of the present invention comprises a light projection source, a projection screen, and, disposed between the projection source and the screen, one or more (compound) lenses, a pixel compensator and a first surface mirror. The compensator and a first surface mirror comprise a reflective pixel structure, which serves as the primary compensator. The compensator acts as the mirror held at a preferred 45° angle with respect to the projection source. This preferred angle may be modified to a greater or lesser angle (preferably with 4°) either way. (This small amount of movement would compensate for distortion similar to that seen in the display of an overhead projector lens that has been tipped too far in one direction.) The pixel compensator itself is the compensating pixel structure. The plane compensates for the non-uniform focus, the keystone distortion, and the vertical non-linearity distortions mentioned above by using an appropriate pixel configuration. Preferably, the pixel configuration is an elongated or a rectangular pixel construction which performs the compensation. A first surface mirror receives the image from the pixel compensator and reflects it onto a projection screen. The first surface mirror corrects for stigmatism and blooming.

The system of the present invention produces an image that requires little, if any, correction. That correction which is required can be made by single, double, or triple lens systems, rather than by the complex lensing conventionally found in correcting light valve projection systems.

The projection system of the present invention also does away with the complex masking also conventionally found in present projection systems.

The present system finds utility in virtually any projection system in which space is limited, thus requiring off-axis projection. Of course, while the preferred angle may be 45°, the pixel configuration of the image plane of the present invention can be modified in virtually unlimited ways to compensate for almost any angle greater or lesser than the preferred 45° angle.

Anticipated applications of the optical system of the present invention include use in vehicle "heads-up" systems. The vehicle may be an air, water, or land-based vehicle. The projection system may be used to project onto the windshield for viewer observation, or may be used to project onto a control monitoring screen for the driver. Additionally, the projection system may be a rear "heads-up" projection system which projects onto the back window of a vehicle.

Additional uses of the pixel compensated electro-optical display system of the present invention include utility as a projection system for virtual reality head gear and also in "Total Immersion" systems which provide the user with "wrap-around" video display.

BRIEF DESCRIPTION OF THE DRAWINGS

A better understanding of the present invention will be had upon reference to the following detailed description when read in conjunction with the accompanying drawings in which like reference characters refer to like parts throughout the several views, and in which.

DETAILED DESCRIPTION OF THE PREFERRED EMBODIMENT OF THE PRESENT INTENTION

The drawings disclose the preferred embodiments of the present invention. While the configurations according to the illustrated embodiments are preferred, it is envisioned that alternate configurations of the present invention may be adopted without deviating from the invention as portrayed. The preferred embodiments are discussed hereafter.

Figures 1, 2, 3, 9:
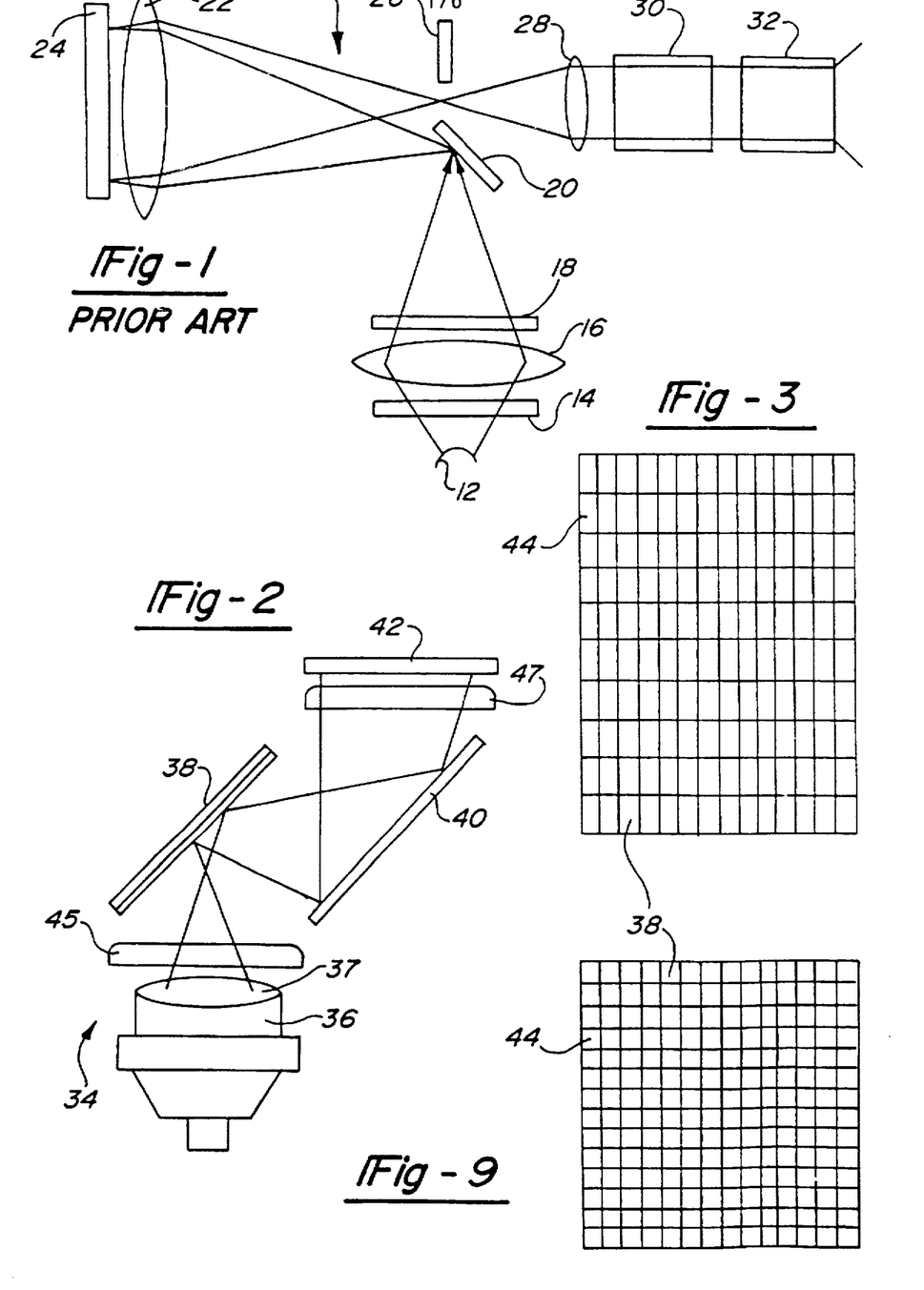
FIG. 1 is a view illustrating the basic and known optical system.
FIG. 2 is a view illustrating the general layout of the optical system of the present invention incorporating the image plane with the compensating pixel structure.
FIG. 3 is a view of the reflecting image display plane of the present invention illustrating the approximate shapes of the pixels as they would appear when the image plane is viewed without any edges being angled away from the viewer.
FIG. 9 is a view of the reflecting image display plane of FIG. 3 when the plane is tilted at a 45° angle with respect to the viewer.

With reference to FIG. 1, a view of the conventionally known optic system is generally illustrated as 10. The system 10 is directed to the correction of matrix-addressed light valves, although it may be used for correcting other projection systems.

The system comprises a bulb 12, a layer of heat absorbing glass 14, a condenser lens combination 16 (only a single lens is shown here for simplicity, but the condenser lens combination comprises a number of lenses), a color filter 18, and a first surface mirror 20. The system 10 also includes a PCX lens 22 (again this is a combination system), a reflecting image plane 24, a scatter mask 26, a columnating lens system 28, a dichroic combiner 30, and, most often, a zoom lens 32. Some variations of this system are known, but the variations commonly add to the lensing system beyond what is shown to the end of correcting optical distortions.

FIG. 1 also generally illustrates the complexity of the known systems for correcting optical distortions in projection systems.

FIG. 2 is a view illustrating the general layout of the optical system of the present invention generally illustrated as 34. The system 34 includes a light projection source 36, a pixel compensator 38, a first surface mirror 40 (to correct for stigmatism and blooming), and a projection surface 42.

The light projection source 36 is one of a number of columnated or polarized light sources. Conversely, the actual image is created on the pixel compensator 38. In the former situation, the source 36 would produce appropriate colors and the components of the pixel compensator would be clear or monochromatic. As an alternative to both systems, a dichroic system could be employed that comprises a white light source and a number of pixel compensators.

One or more condensing lenses 37 may be fitted to the projection source 36. The lens 37 may be a single lens or may be an array of compound lenses.

The source 36 may produce either a white light or a plurality of selected colors. The source 36 may be colored by use of conventional color-coated bulbs or painted or coated LED's.

Alternatively, the source 36 may be colored by filtering techniques such as a color wheel. More particularly, the source 36 may comprise a number of L.E.D.'s of the colors red, green and blue that are strobed prior to projection onto the compensator 38. Alternatively, the source 36 might comprise surface mode L.C.D.'s or ferroelectric liquid crystals;. (The ferroelectric liquid crystals offer the advantage of being of a higher speed range that can accommodate strobing. This makes them a superior choice over, for example, N-CAP or P.D.L.C.'s [polymer dispersed liquid crystals].)

At the heart of the system of the present invention is the pixel compensator 38. The face of the compensator 38 is shown in detail in FIGS. 3 and 4. The compensator may either be fixedly mounted at a preferred angle of 45° or may be pivotably mounted. (The pivoted mounting allows for an additional degree of movement one way or the other to, for example, 4° in either direction.)

The optical system of the present invention as presented in FIG. 2 is based on the image plane design and not through optical correction. The system is based upon Snell's Law theory which is used to achieve a perfectly undistorted image. This is true as applied to the system 34 whether in the HDTV format, NTSC format, 3:4 aspect ratio, or 9:16 aspect ratio. Once the compensator 38 and its pixels are configured correctly, the system can be applied to virtually any optical use.

Figure 4:
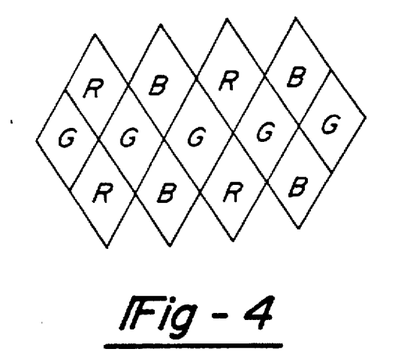
FIG. 4 is a variation of the surface configuration of the reflecting image display plane of FIG. 3.
Figure 5:
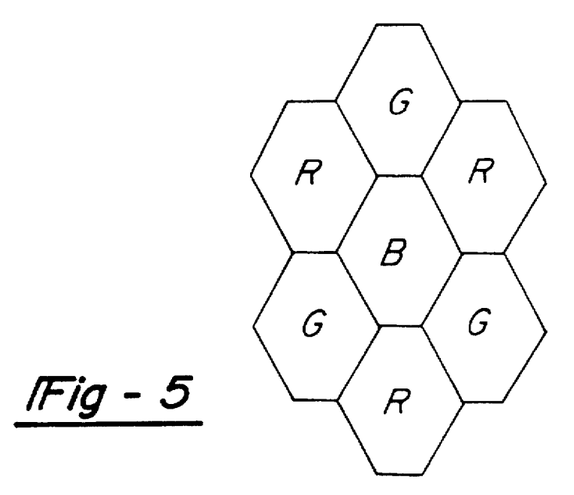
FIG. 5 is an additional variation of the surface configuration of the reflecting image display plane of FIG. 3.

With reference to FIG. 3, a front view of the pixel compensator 38 is illustrated as the approximate shapes of the individual pixels 44 are viewed straight on without any edges of the compensator 38 being angled away from the viewer. As illustrated, the individual pixels 44 have a rectangular shape, although the shape may well be varied depending on the angle of the compensator 38 with respect to the light source and the projection surface. Some of the possible variations are illustrated in FIGS. 4 and 5 which illustrate alternate embodiments of the pixel configuration. Several variations may be possible, provided the individual cells comprise any elongated packing-cell type of configuration. If color production is the compensator-pixel type, certain pixels may provide red color (designated "R"), others may provide blue color (designated "B"), while still others may provide green color (designated "G"). This layout is illustrated in FIGS. 4 and 5.

Figure 6:
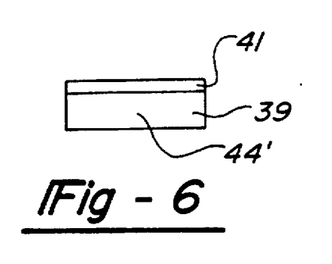
FIG. 6 is a cross-sectional view of a preferred pixel according to the present invention.

As noted, to provide defined colors, either the pixel compensator 38 would introduce defined colors (for example, red, green, and blue) into the system or the defined colors would be introduced by the source 36. A further embodiment, a dichroic system, is also possible and will be discussed below with respect to FIG. 8.

Where the pixel compensated display of the present system requires that the pixel compensator 38 provide color because the source 36 does not provide color, then the pixels 44 would be constructed so as to provide the necessary color. There are a number of ways this may be accomplished. One such construction, as shown in FIG. 6, is fairly simple and includes a pixel 44' comprising a pixel pad 39 having a colored layer 41 (red, green, or blue) disposed directly on the upper surface of the pad 39.

Figure 7:
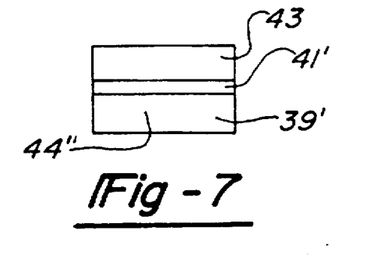
FIG. 7 is a cross-sectional view of an alternative pixel according to the present invention.

Another construction is illustrated in FIG. 7, and illustrates a pixel 44" that comprises a pad 39', a color layer 41', and an upper glass layer 43. According to this latter construction, the upper level of the pixel pad 39' is a reflective surface. Light produced by the source 36 passes through the glass layer 43 to reflect off of the pixel pad 39', and taking on the color of the color layer 41' in the process.

Where the colors are provided by the source, the system would include one or more polarizers for color definition. This is illustrated in FIG. 2 and includes a polarizer 45 disposed between the source 36 and the compensator 38. A second polarizer 47 is optionally disposed between the compensator 38 and the first surface mirror 40. With the polarizers 45 and 47 in place, the light emitted by the source 36 would be defined before striking the compensator 38. Additionally, and as provided for by the second polarizer 47, the image coming from the compensator 38 would be further polarized.

Figure 8:
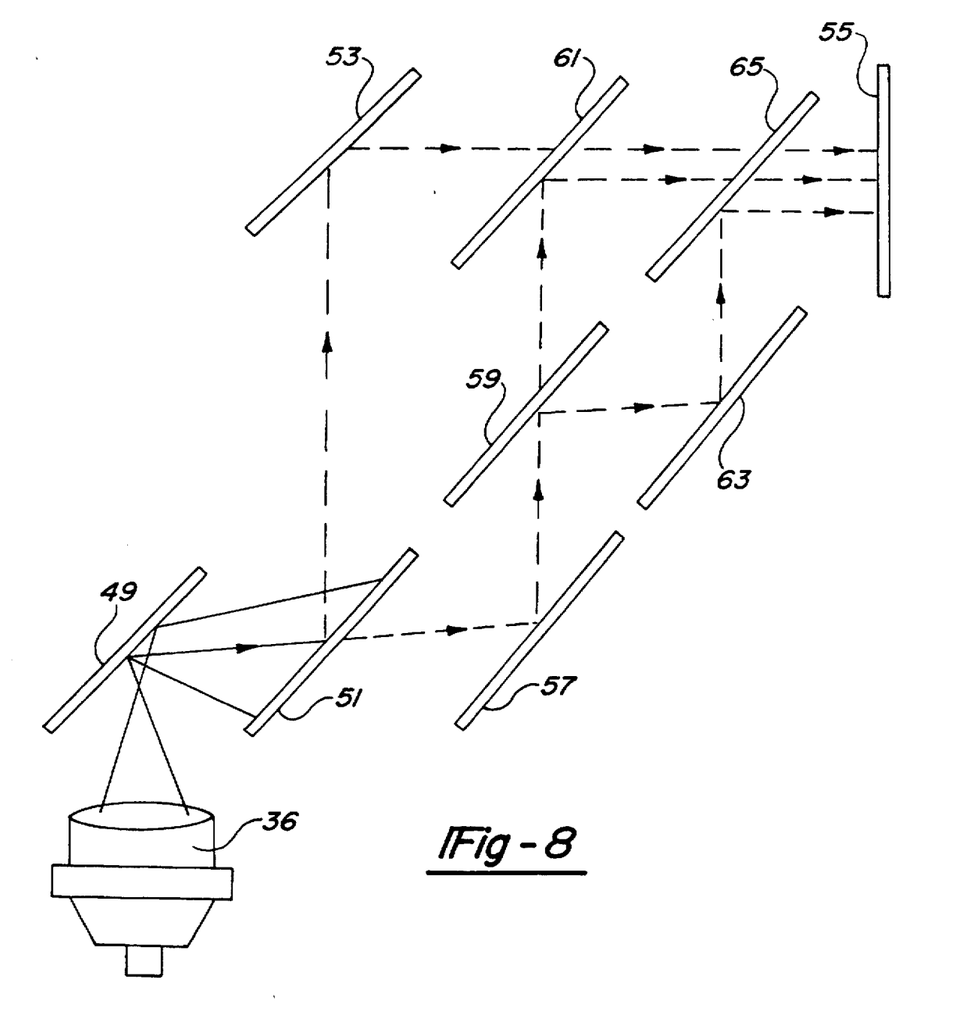
FIG. 8 is a dichroic system that provides an additional method of polarizing light according to the present invention.

An additional method of polarizing—a dichroic system is—illustrated in FIG. 8. According to this system, light is emitted from the source 36 and is received—undefined—onto the compensator 38. The reflected light strikes a first pixel compensated display 49, and all colors are reflected by the display. The reflected image then strikes a first dichroic plate 51 that allows, for example, green and red light to pass, but reflects blue light. The blue light then strikes and is reflected by a first surface mirror 53 and, after passing through selectively transmissive mirrors 61, 65, strikes and appears on a screen 55.

The green and red light passing through the first dichroic plate 51 strikes and is reflected by a second pixel compensated display 57, and both colors are reflected by the display. The reflected image then strikes a second dichroic plate 59 that allows, again by way of example, green light to pass, but reflects red light. The green light then strikes and is reflected by the selectively transmissive mirror 61 and, after passing through the selectively transmissive mirror 65, strikes and appears on the screen 55.

The remaining red light strikes a third pixel compensated display 63 and is reflected thereby onto the selectively transmissive mirror 65 which, in turn, reflects the red light onto the screen 55.

Alternative methods of providing colors (not shown) include technologies that relate to rapidly spinning color wheels, strobing, and pie cell techniques (the latter being an additive process which, for example, substitutes a non-red, green, blue color such as magenta for the basic colors and achieves a red, green or blue color).

FIG. 9 illustrates a view of the pixel compensator 38 when tilted to approximately a 45° angle as it would appear to either the light projection source or the projection surface 42. As can be seen, the elongated shape of the individual pixels is "corrected" and appears to be a conventionally-shaped square. With the possible exception of minor correction, no further correction of the image is necessary, as most (if not all) distortions may be eliminated by proper configuring of the display plane.

Figure 10:
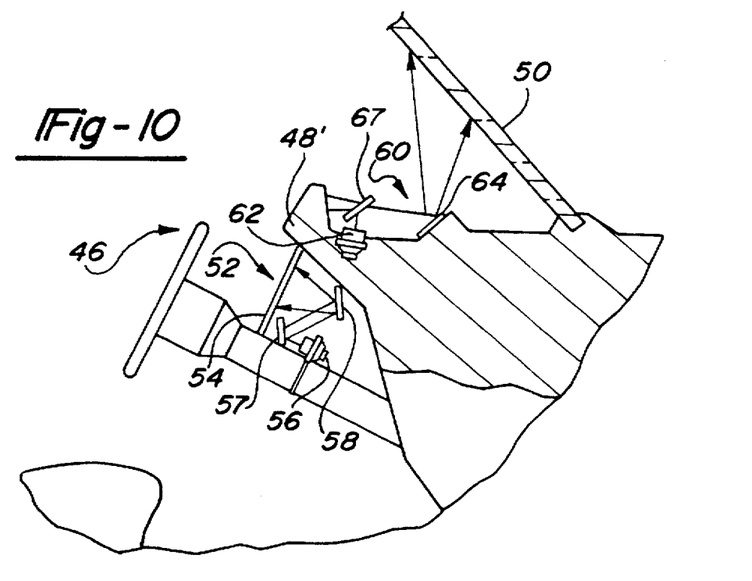
FIG. 10 is a sectional view of a vehicle's driver compartment and illustrating uses of the image plane of the present invention in conjunction with optical systems.

FIG. 10 is a sectional view of a vehicle driver's compartment, generally illustrated as 46. The compartment 46 includes a dash panel 48 and a windshield 50. The compartment 46 may be from a land vehicle, or may be from water or air vehicles as well. Applications are also envisioned for use in space vehicles where restricted room is notorious.

Two display systems of the present invention are shown. The first is an in-dash system, generally illustrated as 52. The in-dash system 52 includes a dash panel 54, a light projection source 56, a first surface mirror 58, and a pixel compensator 57. The image projected to the back of the dash panel 54 is visible to the driver (not shown) on the front (driver-facing) side of the panel 54.

The second display system of the present invention shown in FIG. 10 is a "heads up" system, generally illustrated as 60. The "heads up" system 60 is designed to project pertinent information directly onto the compartment (driver-facing)

side of the windshield 50. The title of this system is derived from the fact that the driver need not refer to the dash board for information, but rather fix attention only to the windshield. This has particular strategic application in fighter aircraft.

The "heads up" system 60 includes a light projection source 62, a pixel compensator 63, and a first surface mirror 64. The compartment side of the windshield 50 acts as the projection screen.

Figure 11:
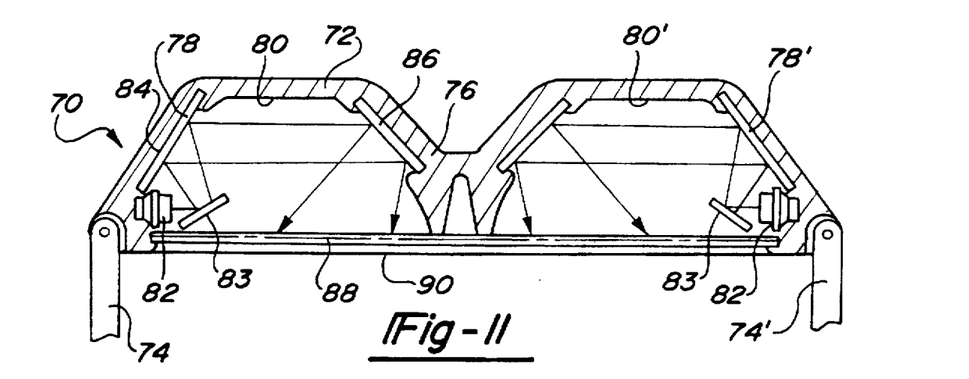
FIG. 11 is a top sectional view of a virtual reality mask illustrating the positioning of the image plane of the present invention in conjunction with optical systems.
Figure 12:
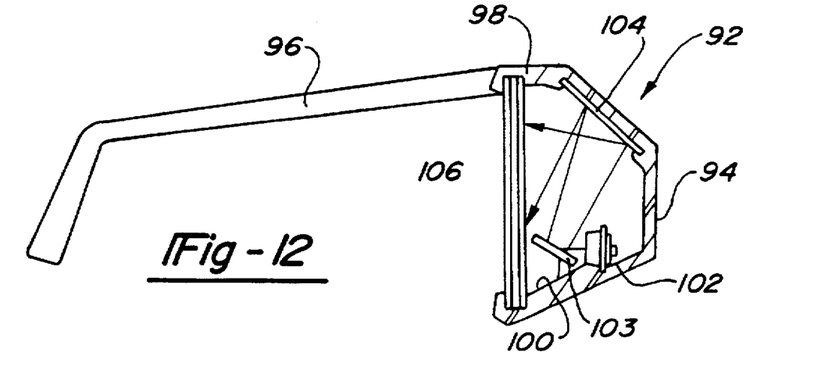
FIG. 12 is a side sectional view of the system of FIG. 6 but showing the optical system and image plane in an alternate position.
Figure 13:
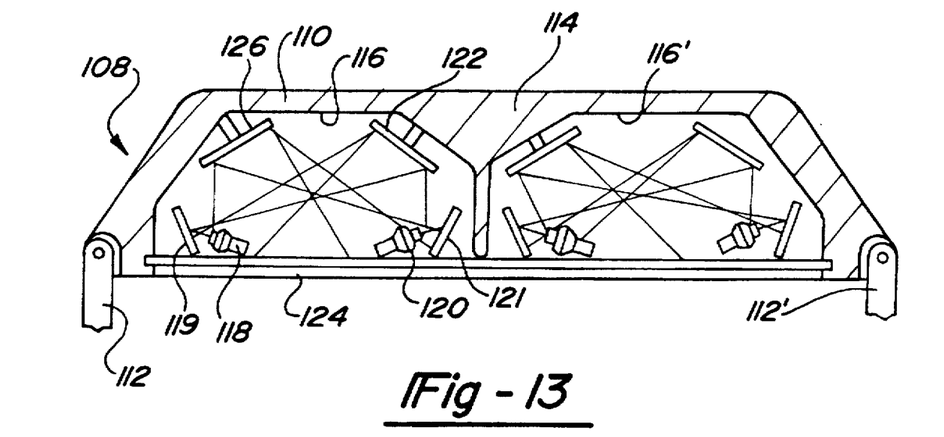
FIG. 13 is yet another alternate view of the virtual reality mask of FIGS. 6 and 7 showing an application of the optical system of the present invention as part of a holographic virtual reality mask.

FIGS. 11 through 13 relate to a head mounted display device for use with a virtual reality system. The reflective image display plane of the present invention finds particular application with this technology because of the constricted space available for the projection system.

With reference to FIG. 11, a top sectional view of a head mounted display device is illustrated, generally shown as 70. The display device 70 includes a frame 72 having a pair of head temple arms 74, 74' and a front piece 76. The frame 72 may be composed of about any polymerized material that is light weight and durable. The light weight is an important factor, else the user would tire quickly of wearing the display device 70. A pair of built-in earphones (not shown) may be provided, and would preferably be suspended from each of the temple arms 74, 74' to fit in the ears of the user.

A left projection system 78 and a right projection system 78'0 are provided within two cavities 80, 80' defined in the frame 72. The systems 78, 78' are mirror images of each other.. In all other respects the two systems 78, 78' are identical. Accordingly, only the left system 78 will be discussed in detail.

A light projection source 82 is provided off to one side or the other of the cavity 80. A pixel compensator 83 is provided adjacent to the source 82. A first surface mirror 84 is mounted within the cavity 80 at approximately a 55° angle, although a greater or lesser degree may be used provided the shape of the pixels is appropriately configured. A first surface mirror 86 is included to redirect the image received from the mirror 84 onto the back side of a projection surface 88. The projection surface 88 would preferably be composed of a holographic diffuser or, alternatively, of a similar material such that the wearer (not shown) may view the produced image on a viewing side 90 of the device 70.

FIG. 12 illustrates a sectional view taken through the side of an alternative embodiment of the head mounted display device of FIG. 11. FIG. 12 illustrates a device, generally shown as 92, that includes a frame 94 having a temple arm 96 and a front piece 98. A cavity 100 is defined within the front piece 98. Within the cavity 100 is disposed a light projection source 102, a pixel compensator 103, and a first surface mirror 104. A holographic projection surface 106 receives the image for viewing.

FIG. 13 illustrates yet another alternate embodiment of the head mounted display device of FIG. 11. The device of FIG. 13, generally illustrated as 108, is a modified version of the head mounted display device that produces a holographic image for the wearer. Specifically, the device 108 comprises a frame 110 having a pair of temple arms 112, 112' and a front piece 114. Within the front piece 114 are defined a pair of cavities 116, 116'. The projection systems disposed within the cavities 116, 116' are identical, and hence only one system will be discussed in detail herein.

A first light projection source 118 is provided at one side of the cavity 116 and a second light projection source 120 is provided at another side of the cavity 116. A first surface mirror 122 conveys the light received from a pixel compensator 119 to a projection surface 124. A first surface mirror 126 conveys the light received from pixel compensator 121 to the projection surface 124. (The projection sources 118, 120 do not interfere with the reflected images because they are positioned either above or below the planes of the reflected images.) The cumulative image produced on the projection surface 124 is perceived by the viewer (not shown) to be a holographic image.

Figure 14:
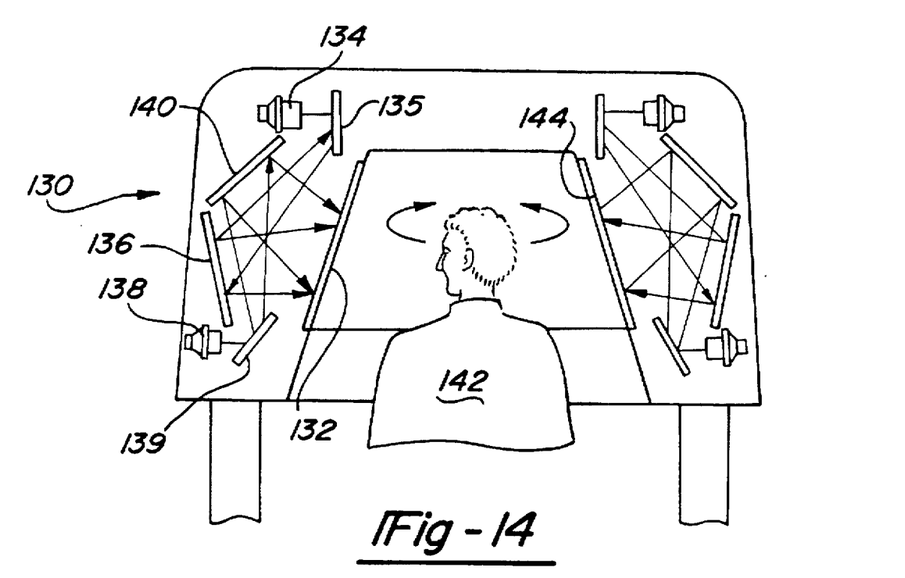
FIG. 14 illustrates a sectional view of a full immersion holographic display system utilizing the optical system of the present invention.

FIG. 14 illustrates a sectional view of a full immersion holographic display system utilizing the optical system of the present invention, generally indicated as 130. The immersion display system 130 has many uses, including film viewing and for playing video arcade games. The projection system of the system 130 is constructed so as to provide a "seamless" view to eliminate the edges commonly encountered in CRT screens.

To accomplish the holographic effect, a single projection surface 132 has two images being projected onto it simultaneously. An upper light projection source 134 directs an image first to a pixel compensator 135, then to a lower first surface mirror 136 which, in turn, conveys the image to the surface 132. A lower light projection source 138 directs a reversed image first to a pixel compensator 139, then to an upper first surface mirror 140, and, finally, to the projection surface 132. Because the images are reversed with respect to each other and are overlapping, a viewer 142 perceives the image produced on the viewing side of the surface 132 as being fully three-dimensional. The viewer 142 interprets the wrap-around screens (an opposite screen 144 is illustrated, but it should be understood that the viewer 142 is fully encompassed by the side screens) as being a viewing "bubble".

Figure 15:
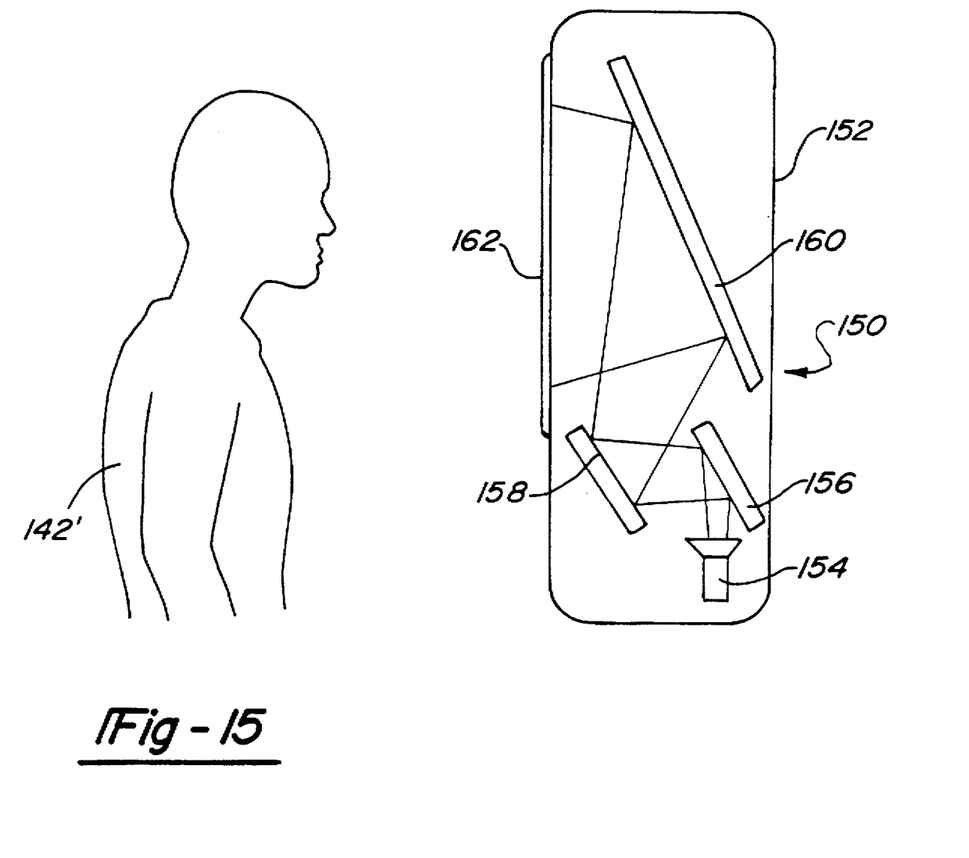
FIG. 15 is a further variation of the display system of FIG. 14.

As a further variation of the display system of FIG. 14, FIG. 15 illustrates a more conventional projection system employing the pixel compensated display of the present invention. The display, generally indicated as 150, comprises a housing 152 and a number of internal components. These components include a source 154, a pixel compensator 156, a first surface mirror 158, an image reflecting and aligning mirror 160, and a rear projection screen 162. A viewer 142' views the projected image as illustrated.

Having described my invention, however, many modifications thereto will become apparent to those skilled in the art to which it pertains without deviation from the spirit of the invention as defined by the scope of the appended claims.

I claim:

1. A pixel compensated electro-optical display system, said system comprising:

a light source comprised of a plurality of light emitting diodes;

at least one reflective image display plane, said plane comprising a plurality of pixels, each of said pixels having a front surface, said front surface of each of said pixels having a length and a width, said length of said front surface being greater than said width of said front surface;

a first surface mirror; and at least one projection surface.

2. The display system of claim 1, wherein said front surface of each of said pixels has a rectangular shape.

3. The display system of claim 1, wherein said front surface of each of said pixels has a diamond shape.

4. The display system of claim 1, wherein each of said pixels has a long axis, said pixels being aligned so that said long axis of each pixel is parallel with each other pixels.

5. The display system of claim 1, further including a head mounted display unit.

6. The display system of claim 1, wherein said light source generates colunmated light.

7. The display system of claim 1, wherein said light source generates polarized light.

8. The display system of claim 1, wherein said light source generates white light.

9. The display system of claim 1, wherein said light source generates colored light.

10. The display system of claim 9, further including a polarizer.

11. The display system of claim 1, wherein said plurality of diodes include red, green and blue diodes.

12. The display system of claim 1, further including a plurality of dichroic plates and a plurality of said image display planes.

13. A pixel compensated electro-optical display system, said system comprising:

a light source;

at least one reflective image display plane, said plane comprising a plurality of pixels, each of said pixels having a front surface, said front surface of each of said pixels having a length and a width, said length of said front surface being greater than said width of said front surface;

a first surface mirror; and a plurality of projection surfaces.

14. The display system of claim 13, farther including a structure having an internal space, said internal space being of such dimension to permit the entry of the head of a human, said structure having a peripheral wall, said plurality of projection surfaces being disposed on said peripheral wall.

15. A pixel compensated electro-optical display system, said system comprising:

a light source;

at least one reflective image display plane disposed at an acute angle with respect to said light source;

a first surface mirror; and at least one projection surface, whereby said at least one reflective image display plane substantially compensates for image distortion between said light source and said at least one projection surface.

16. The reflective image display plane of claim 15, wherein said plane comprises a plurality of pixels, each of said pixels having a front surface.

17. The display system of claim 15, wherein said light source generates polarized light.

18. The display system of claim 15, wherein said light source generates white light.

19. The reflective image display plane of claim 16, wherein each of said pixels has at least four sides, at least one of said four sides having a length greater than at least one other of said four sides.

* * * * *